US00RE41241E

(19) United States
(12) Reissued Patent
Giampavolo et al.

(10) Patent Number: US RE41,241 E
(45) Date of Reissued Patent: Apr. 20, 2010

(54) LABEL ENLARGING DEVICE

(75) Inventors: Paul Giampavolo, Fairfield, NJ (US); Christine Giampavolo, Fairfield, NJ (US)

(73) Assignee: Christine Giampavolo and Paul Giampavolo, Budd Lake, NJ (US)

(21) Appl. No.: 10/744,895

(22) Filed: Dec. 22, 2003

Related U.S. Patent Documents

Reissue of:
(64) Patent No.: 6,597,523
Issued: Jul. 22, 2003
Appl. No.: 09/957,578
Filed: Sep. 20, 2001

U.S. Applications:
(60) Provisional application No. 60/234,419, filed on Sep. 21, 2000.

(51) Int. Cl.
*G02B 27/02* (2006.01)
*G02B 7/02* (2006.01)

(52) U.S. Cl. ..... 359/802; 359/811
(58) Field of Classification Search ..... 359/802, 359/803, 811, 812, 818
See application file for complete search history.

(56) References Cited

U.S. PATENT DOCUMENTS

| | | | | | |
|---|---|---|---|---|---|
| 2,172,432 | A | * | 9/1939 | Brodsky | 194/295 |
| 3,140,883 | A | | 7/1964 | Anthony | |
| 3,936,156 | A | | 2/1976 | Shaw | |
| 3,955,884 | A | | 5/1976 | Del Pesco, Sr. | |
| 4,094,598 | A | | 6/1978 | Hodges | |
| 4,190,322 | A | | 2/1980 | Wortley | 359/668 |
| 4,712,870 | A | | 12/1987 | Robinson et al. | 359/738 |
| 4,819,351 | A | * | 4/1989 | Boitani | 40/654.01 |
| 5,113,289 | A | | 5/1992 | Soper | 359/811 |
| 5,204,775 | A | | 4/1993 | McDevitt | |
| 5,218,482 | A | | 6/1993 | Cioffi | |
| 5,245,477 | A | | 9/1993 | Nyman | 359/818 |
| 5,307,209 | A | | 4/1994 | Iaquinto et al. | |
| 5,309,279 | A | | 5/1994 | Halstead | |
| 5,471,347 | A | | 11/1995 | Galiani | |
| 5,615,768 | A | | 4/1997 | Schermerhorn | |
| 5,847,883 | A | | 12/1998 | Rispoli, Sr. | |
| 5,926,315 | A | | 7/1999 | McBride | 359/534 |
| 6,137,639 | A | | 10/2000 | Woolwine | 359/802 |
| 6,233,102 | B1 | | 5/2001 | Hogan, Jr. | 359/802 |
| 7,218,463 | B1 | * | 5/2007 | Arsenault | 359/817 |

FOREIGN PATENT DOCUMENTS

| | | | | |
|---|---|---|---|---|
| DE | 4424747 | C1 | * | 7/1995 |
| DE | 102004042433 | A1 | * | 3/2006 |
| GB | 2288248 | | | 11/1995 |
| GB | 2337338 | | | 11/1999 |
| JP | 08136834 | A | * | 5/1996 |
| JP | 08-136834 | | | 5/1996 |
| JP | 10-078194 | | | 3/1998 |
| JP | 2001053852 | A | * | 2/2001 |
| JP | 2001083437 | A | * | 3/2001 |

* cited by examiner

*Primary Examiner*—David N Spector
(74) *Attorney, Agent, or Firm*—Ostrolenk Faber LLP

(57) ABSTRACT

A magnification device for attachment to store merchandise shelving for magnifying merchandise labeling information including an optical magnification member; a bracket for attachment to merchandise shelving; the optical magnification member being attached to the bracket. A connector is preferably provided connecting the magnification member to the bracket and preferably allows the magnification member to be moved into one of a plurality of positions to enable the magnification member to be provided into a position allowing the merchandise labeling to be displayed.

22 Claims, 5 Drawing Sheets

LABEL ENLARGING DEVICE

Matter enclosed in heavy brackets [ ] appears in the original patent but forms no part of this reissue specification; matter printed in italics indicates the additions made by reissue.

CROSS REFERENCE TO RELATED APPLICATION

This application claims the priority and benefit of U.S. Provisional application Ser. No. 60/234,419 filed Sep. 21, 2000 and entitled "LABEL ENLARGER", the entire disclosure of which is hereby incorporated by reference.

BACKGROUND OF THE INVENTION

The present invention relates to magnifying devices, and in particular, it relates to a magnifying device for printed matter, such as labels.

In consumer sales establishments such as shopping centers and supermarkets, there is a need to aid customers with eyesight problems to read labeling materials, for example, Food and Drug Administration (FDA) regulation nutritional and ingredient labels for food and other labels for products typically purchased in stores. A large portion of the general public is becoming older, sometimes referred to as the aging of the baby boom generation. Additionally, consumers are becoming increasingly concerned about food ingredients and seek the information of the labels to make an educated purchase decision. However, the information on the labels is usually very small and hard to read. The present invention is directed to providing a device for magnification of such labels.

SUMMARY OF THE INVENTION

The invention includes a magnification member that instantly enlarges the content of a label when the product label is positioned on the opposing side of the device, making it easy to read without eye strain. The magnification member may comprise a magnification sheet or lens, for example, a Fresnel lens or any other appropriate magnification device. The device according to the invention may be easily and permanently affixed to store shelving making it accessible to customers. The device of the invention may also have an area for brand name or logo imprints or advertising information thus making it a medium for advertising.

Other features and advantages of the present invention will become apparent from the following description of the invention which refers to the accompanying drawings.

BRIEF DESCRIPTION OF THE DRAWING(S)

The invention will be described in greater detail in the following detailed description with reference to the drawings in which.

DETAILED DESCRIPTION OF EMBODIMENTS OF THE INVENTION

Figure 1:
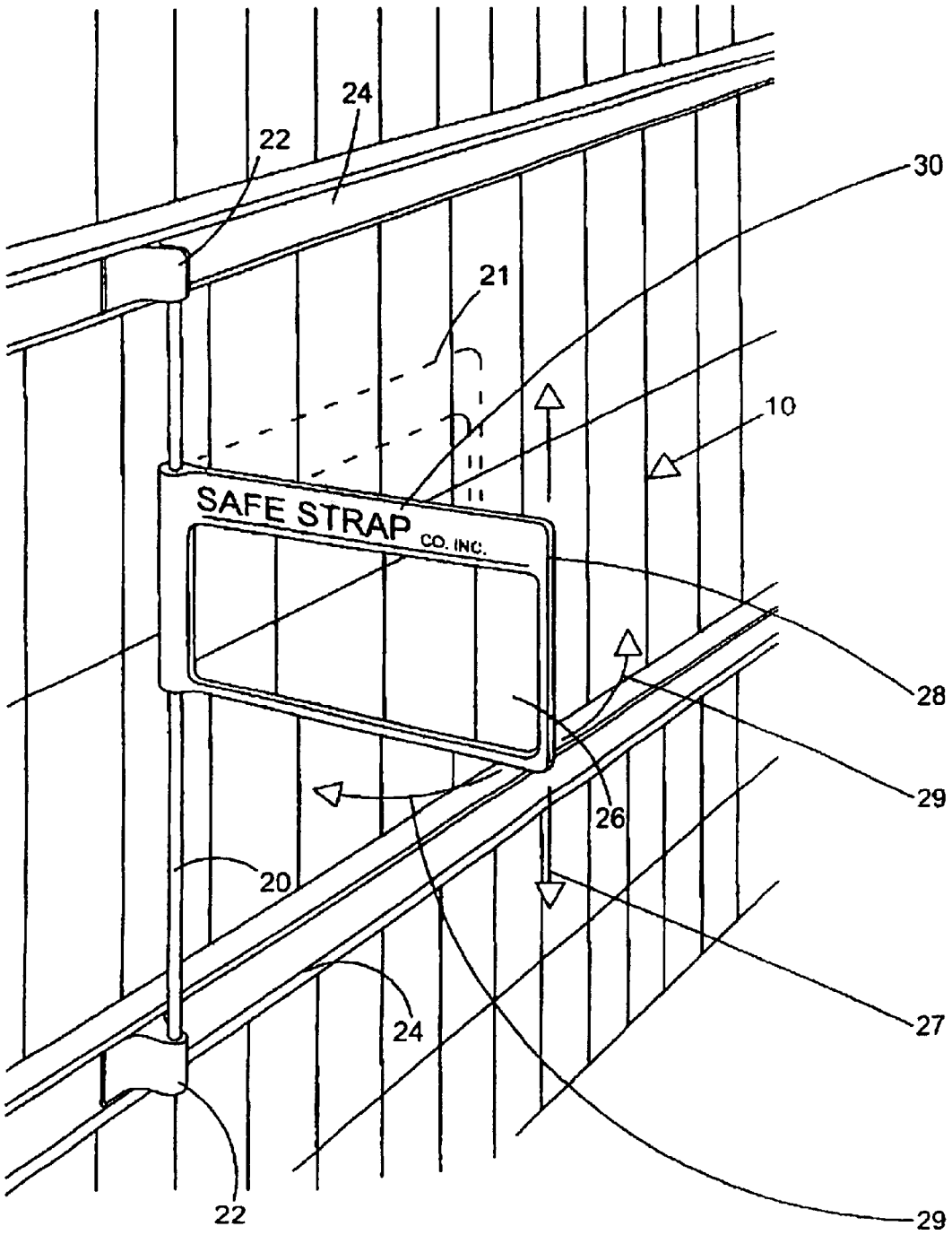
FIG. 1 is a perspective view of a first embodiment of the invention.

With reference to the drawings, the label enlarging device is shown generally by reference numeral 10. In FIG. 1, the device 10 can be mounted on a rod or shaft 20 suitably mounted by brackets 22. Brackets 22 may be affixed by any convenient means to the store shelving 24. The shelving 24 is provided for storing and displaying merchandise to be sold. The device 10 may comprise a magnification plate 26 mounted to a suitable frame or bezel 28. The frame or bezel 28 may include an area 30 for advertising material. In FIG. 1, the magnification plate 26 may comprise a magnification sheet or lens as is well known. These types of magnification sheets or lens or may comprises for example, a Fresnel lens.

The device 10 is preferably pivotable on the shaft 20 and/or the shaft 20 may be pivotable in the brackets 22. This will facilitate rotation of the device 10 out of the way of the aisle when the consumer is not using the device. To use the device, the consumer height and rotation the device 10 at an appropriate height and amount of rotation and moves an item to be viewed behind lens 26, so that the label is enlarged allowing the consumer to read the label. The device 10 of FIG. 1 is preferably slidable in the vertical direction 27 on the shaft 20 so that the consumer can raise or lower the device to a comfortable position depending upon the consumer's height. It is rotatable as shown by arrows 29. When stowed, it can be folded neatly against the shelving, as shown at 21.

Figure 2:
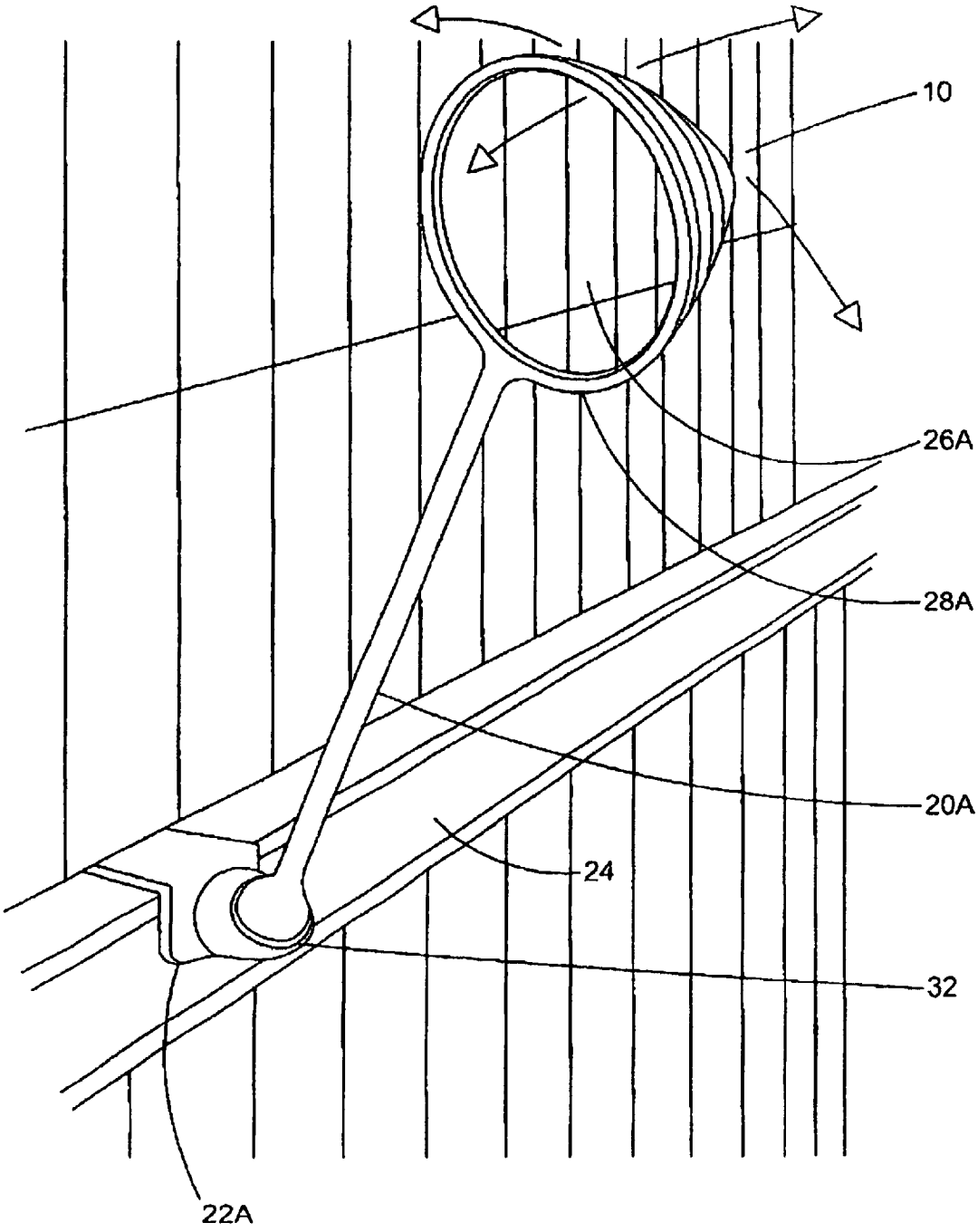
FIG. 2 is a perspective view of a second embodiment of the invention.

FIG. 2 shows a second embodiment of the invention 10. The invention includes a lens 26A mounted in a frame 28A. The lens may be circular as shown or can have any other shape. The frame 28A is connected to a shaft 20A, preferably integrally, and coupled to a bracket 22A by a suitable flexible joint such as a ball and socket joint 32. This allows the lens 26A to move in three dimensions so that the user can position the device 10 at a comfortable position to read the label of the merchandise. The bracket 22A is fastened to the store shelving 24 by any suitable means.

Figure 3:
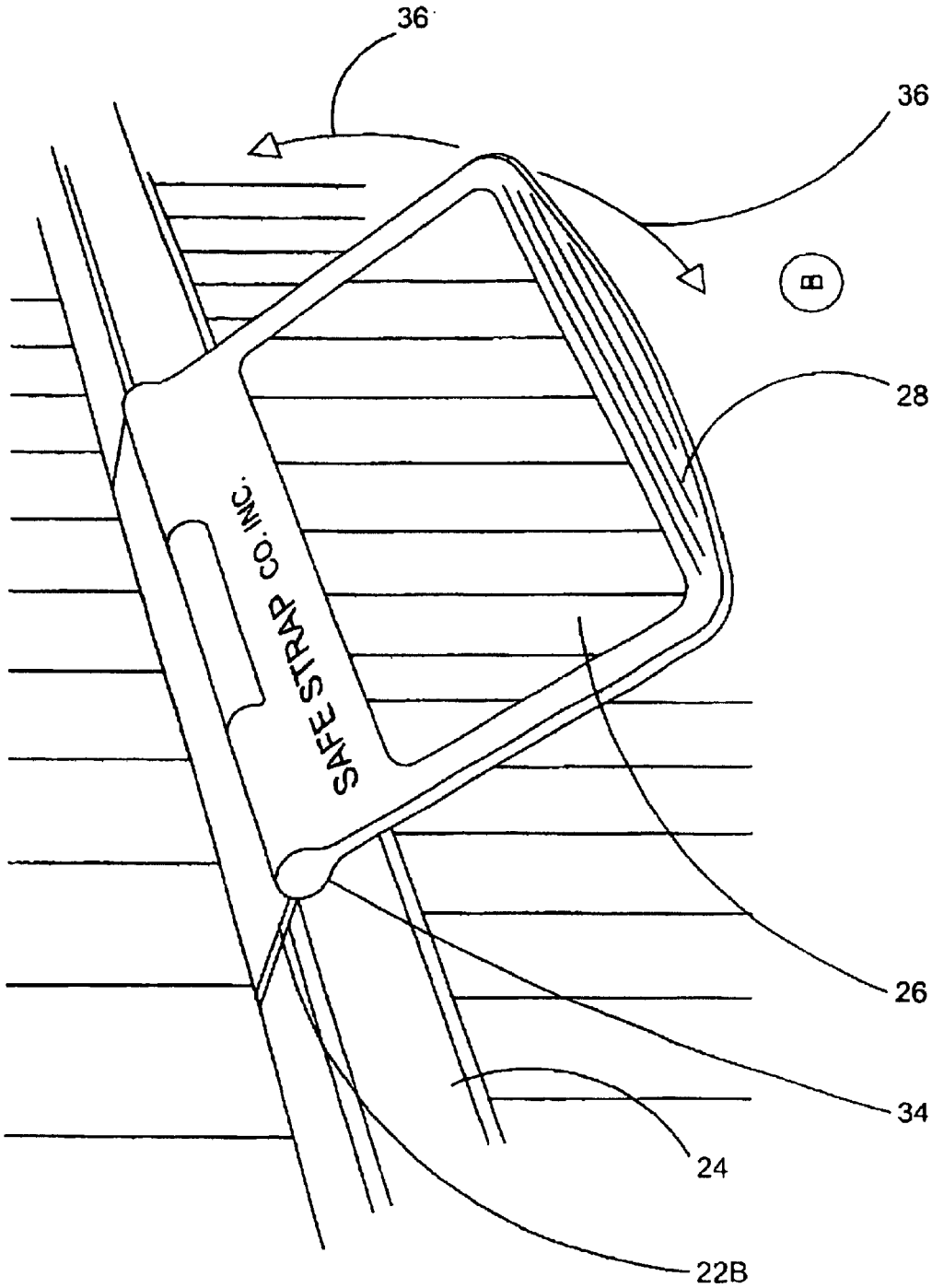
FIG. 3 is a perspective view of a third embodiment of the invention.

FIG. 3 shows a third embodiment of the invention which is similar to the device of FIG. 1 having a plate lens 26 fastened to a bezel 28. A bracket 22B is suitably fastened to store shelving 24. The bracket 22B is hingedly connected to the bezel 28 by a hinge joint 34. The device of FIG. 3 can be moved to any angular position shown by the arrows 36.

Figure 4:
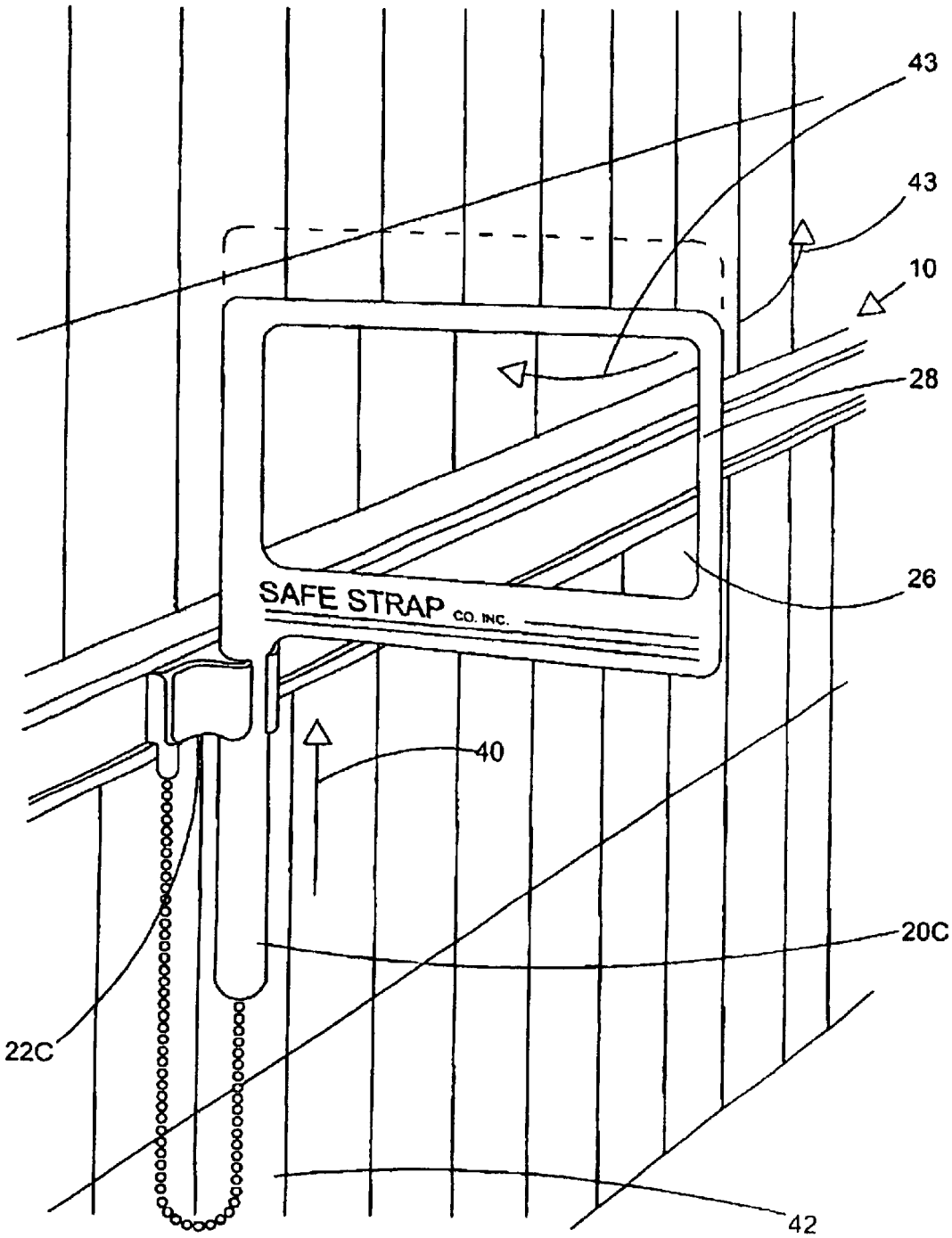
FIG. 4 is a perspective view of a fourth embodiment of the invention.

FIG. 4 shows a fourth embodiment which may be similar to the device of FIG. 1 having a sheet lens 26 mounted in a frame 28. Preferably integrally formed with the frame 28 is a shaft 20C. The shaft 20C is slidable in a bracket 22C which can be a snap bracket for holding the shaft 20C. The magnifier 10 can be used in place and is adjustable in the direction of the arrow 40 and rotatable as shown by arrows 43. The magnifier 10 may be removed from the bracket 22C either by snapping it out of the bracket or moving it vertically upwardly so that the shaft comes out of the hole in the bracket 22C. Preferably, the device 10 is coupled to the bracket 22C by a coupling device 42, for example a chain, twine or other flexible member so that it will not be lost and cannot be dropped to the floor. The device shown in FIG. 4 can be used in any position, only limited by the length of the flexible coupling device 42.

Because the device is used by consumers, the lenses 26 are preferably made of a suitable plastic material so they will not easily break.

Figure 5:
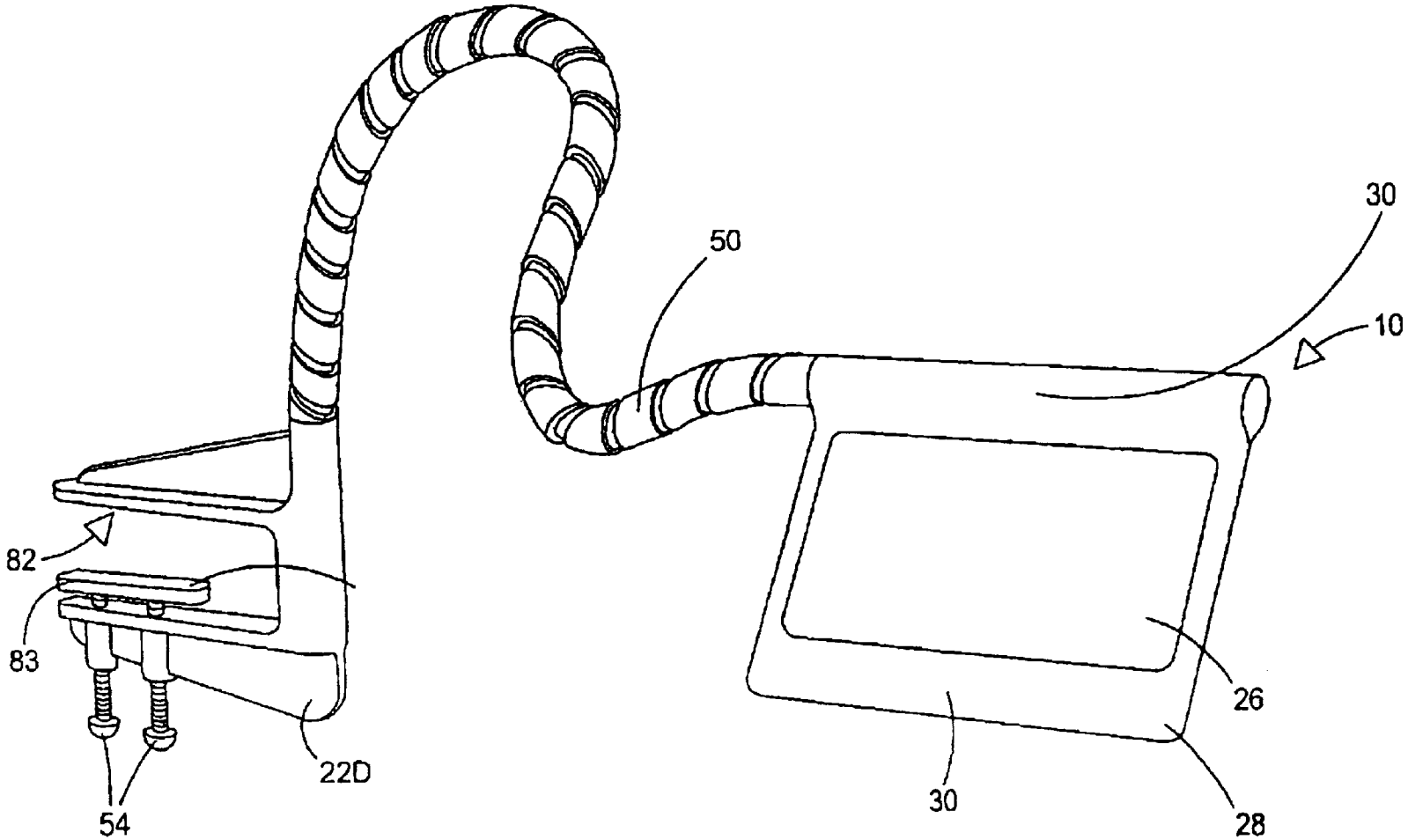
FIG. 5 is a perspective view of a fifth embodiment of the invention.

FIG. 5 shows a fifth embodiment of the invention. The device has a suitable magnification lens 26 as in the other embodiments surrounded by a frame or bezel 28. A flexible arm 50 is provided coupling the bezel 28 to a mounting bracket 22D. The mounting bracket 22D may include a suitable clamp 52 having a movable clamping surface 53 adjustable by screws or thumb screws 54. The bracket 22D with clamp 52 can be used in any of the above described embodiments. The flexible arm 50 may be any suitable flexible connector which holds its position when bent into a particular position. An example of such a flexible arm might be, for example, the flexible necks used with commonly available flashlights or any other flexible arm, for example used commonly with lighting fixtures, for example, gooseneck lighting devices, as well known to those of skill in the art. As in the other embodiments, the frame 28 includes areas 30 which can be provided with suitable advertising or other graphical or written material.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A magnification device for attachment to store merchandise shelving for magnifying merchandise labeling information comprising:

an optical magnification member;

a bracket for attachment to merchandise shelving, the optical magnification member being attached to the bracket;

further comprising a connector connecting the magnification member to the bracket;

further comprising a holder for the magnification member, and wherein the connector connects the holder for the magnification member to the bracket; and wherein the connector comprises a shaft, the holder including an aperture therethrough through which the shaft is mounted enabling the holder to pivotally mount on the shaft.

2. The device of claim 1, wherein the holder is slidable on the shaft.

3. The device of claim 1, wherein the shaft is rotatable in the bracket.

4. The device of claim 1, wherein two brackets are provided with one end of the shaft provided in each bracket.

5. The device of claim 1, wherein the magnifying member is a circular lens.

6. The device of claim 1, wherein the holder for the magnification member is coupled to the bracket via a hinge.

7. A magnification device for attachment to store merchandise shelving for magnifying merchandise labeling information comprising:

an optical magnification member;

a bracket for attachment to merchandise shelving, the optical magnification member attached to the bracket; and further comprising a connector comprising a shaft connecting the magnification member to the bracket;

wherein the connector includes a swivel joint connecting the shaft to the bracket.

8. The device of claim 7, wherein the swivel joint comprises a ball and socket joint.

9. A magnification device for attachment to store merchandise shelving for magnifying merchandise labeling information comprising:

an optical magnification member;

a bracket for attachment to merchandise shelving, the optical magnification member being attached to the bracket;

further comprising a connector connecting the magnification member to the bracket;

further comprising a holder for the magnification member, and wherein the connector connects the holder for the magnification member to the bracket; and wherein the connector comprises a shaft disposable in an opening provided in the bracket.

10. The device of claim 9, wherein the shaft is slidable in the opening in the bracket.

11. The device of claim 9, wherein the connector is removable from the bracket so that the magnification member held by the holder can be removed from the bracket and held by hand.

12. The device of claim 9, wherein the shaft is removable from the bracket so that the magnification member held by the holder can be removed from the bracket and held by hand.

13. The device of claim 9, further comprising a coupling member connected between the holder and the bracket.

14. The device of claim 13, wherein the coupling member comprises a flexible member.

15. The device of claim 14, wherein the flexible member comprises a chain or string.

[16. A magnification device for attachment to store merchandise shelving for magnifying merchandise labeling information comprising:

an optical magnification member;

a bracket for attachment to merchandise shelving, the optical magnification member being attached to the bracket;

further comprising a connector connecting the magnification member to the bracket; and wherein the connector comprises a flexible arm that maintains its position when moved.]

[17. The device of claim 16, wherein the connector allows the magnification member to be moved into one of a plurality of positions to enable the magnification member to be provided into a position allowing the merchandise labeling to be displayed.]

[18. The device of claim 16, wherein the magnification member comprises a generally planar lens.]

[19. The device of claim 16, wherein the magnification member comprises a generally planar plastic lens.]

[20. The device of claim 16, wherein the magnification member comprises a generally planar plastic Fresnel lens.]

[21. The device of claim 16, further comprising a holder comprising a frame for the magnification member.]

[22. The device of claim 21, wherein the frame has an area for graphical or written material.]

[23. A magnification device for attachment to store merchandise shelving for magnifying merchandise labeling information comprising:

an optical magnification member;

a bracket for attachment to merchandise shelving, the optical magnification member being attached to the bracket; and wherein the bracket comprises an adjustable clamp for clamping to the merchandise shelving.]

*24. A magnification device for attachment to store merchandise shelving to magnify merchandise labeling information, the magnification device comprising:*

*an optical magnification member to magnify the merchandise labeling information;*

*a bracket configured to be attached to the merchandise shelving for removably holding the optical magnification member; and*

*a flexible connector coupled to the optical member and to the bracket, the flexible connector having a length and*

*being incapable of maintaining a fixed position without external support;*

*wherein the optical member is usable in a plurality of first positions when the optical member is held by the bracket and in a plurality of second positions limited only by the length of the flexible connector when the optical member is removed from the bracket.*

*25. The magnification device of claim 24, wherein the flexible connector includes a chain.*

*26. The magnification device of claim 24, wherein the flexible connector includes twine.*

*27. A magnification device for attachment to store merchandise shelving to magnify merchandise labeling information, the magnification device comprising:*

*an optical magnification member to magnify the merchandise labeling information;*

*a bracket configured to be attached to the merchandise shelving for removably holding the optical magnification member; and*

*a chain coupled to the optical member and to the bracket to prevent the optical magnification member from being one of lost and dropped to a floor,*

*wherein the optical member is usable in a plurality of first positions when the optical member is held by the bracket and in a plurality of second positions limited only by the length of the chain when the optical member is removed from the bracket.*

*28. A magnification device for attachment to store merchandise shelving to magnify merchandise labeling information, the magnification device comprising:*

*an optical magnification member to magnify the merchandise labeling information;*

*a bracket configured to be attached to the merchandise shelving for removably holding the optical magnification member; and*

*twine coupled to the optical member and to the bracket to prevent the optical magnification member from being one of lost and dropped to a floor,*

*wherein the optical member is usable in a plurality of first positions when the optical member is held by the bracket and in a plurality of second positions limited only by the length of the twine when the optical member is removed from the bracket.*

*29. A magnification device for attachment to store merchandise shelving having at least one track for receiving price label information, and for magnifying merchandise labeling information, the magnification device comprising:*

*an optical magnification member;*

*a bracket for attachment to the merchandise shelving for removably holding the optical magnification member and enabling the optical magnification member to be used in a plurality of first positions when held by the bracket;*

*further comprising a flexible connector connecting the magnification member to the bracket, the flexible connector preventing the magnification member from being lost or dropped to the floor when the magnification member is removed from the bracket and enabling the optical magnification member to be used in a plurality of second positions when removed from the bracket; and*

*wherein said bracket comprises a fixture adapted to couple to a track of the merchandise shelving so as to thereby attach the bracket to the merchandise shelving.*

*30. A magnification device for attachment to store merchandise shelving having at least one track for receiving price label information, and for magnifying merchandise labeling information, the magnification device comprising:*

*an optical magnification member;*

*a bracket for attachment to the merchandise shelving for removably holding the optical magnification member;*

*further comprising a flexible connector connecting the optical magnification member to the bracket, the flexible connector having a length and being incapable of maintaining a fixed position without external support;*

*wherein the optical magnification member is usable in a plurality of first positions when the optical member is held by the bracket and in a plurality of second positions limited only by the length of the flexible connector when the optical member is removed from the bracket; and*

*wherein said bracket comprises a fixture adapted to couple to a track of the merchandise shelving so as to thereby attach the bracket to the merchandise shelving.*

* * * * *